(12) United States Patent
Braithwaite et al.

(10) Patent No.: US 11,869,737 B2
(45) Date of Patent: Jan. 9, 2024

(54) PUSH-BUTTON SWITCH ASSEMBLY AND DIAGNOSIC METHODS THEREOF

(71) Applicant: Ford Global Technologies, LLC, Dearborn, MI (US)

(72) Inventors: Paul Braithwaite, London (GB); Martin Scheck, NRW (DE); James Michael Weinfurther, Farmington, MI (US); Gabriel Dascalu, Chelmsford (GB); Eric L Reed, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 17/545,124

(22) Filed: Dec. 8, 2021

(65) Prior Publication Data
US 2023/0178323 A1 Jun. 8, 2023

(51) Int. Cl.
*H01H 83/04* (2006.01)
*H01H 13/14* (2006.01)
*B60K 35/00* (2006.01)

(52) U.S. Cl.
CPC ............ *H01H 83/04* (2013.01); *H01H 13/14* (2013.01); *B60K 35/00* (2013.01)

(58) Field of Classification Search
CPC ......... H01H 83/04; H01H 13/14; B60K 35/00
USPC .......................................................... 361/1
See application file for complete search history.

(56) References Cited

U.S. PATENT DOCUMENTS

| 7,216,616 | B2 | 5/2007 | Asada et al. | |
|---|---|---|---|---|
| 7,407,464 | B2 | 8/2008 | Tanioka et al. | |
| 9,543,089 | B2 | 1/2017 | Kirita | |
| 10,598,142 | B2 | 3/2020 | Imai et al. | |
| 2006/0043795 | A1 | 3/2006 | Eguchi et al. | |
| 2009/0225572 | A1* | 9/2009 | Pauli | H02M 7/5387 363/56.01 |
| 2012/0199461 | A1* | 8/2012 | Shim | B60R 25/00 200/52 R |
| 2014/0345555 | A1* | 11/2014 | Koenen | B60K 28/04 123/179.3 |
| 2015/0179366 | A1* | 6/2015 | Kirita | F02N 11/0807 200/314 |
| 2015/0308566 | A1* | 10/2015 | Bialas | F16H 59/12 200/5 E |

FOREIGN PATENT DOCUMENTS

| CN | 104570719 | 4/2015 |
|---|---|---|
| CN | 209247981 | 8/2019 |

* cited by examiner

*Primary Examiner* — Kevin J Comber
*Assistant Examiner* — Sreeya Sreevatsa
(74) *Attorney, Agent, or Firm* — Haley Guiliano LLP

(57) ABSTRACT

Systems and methods are described for a push-button switch assembly with the ability to diagnose faults. The push-button switch assembly comprises a first circuit comprising a first resistor arranged in series with a first switch, and a second resistor arranged in parallel with the first resistor and the first switch, and a second circuit comprising a third resistor arranged in series with a second switch, and a fourth resistor arranged in parallel with the third resistor and the second switch, wherein the first switch and the second switch are each closable by displacement of a push-button of the push-button switch assembly.

17 Claims, 10 Drawing Sheets

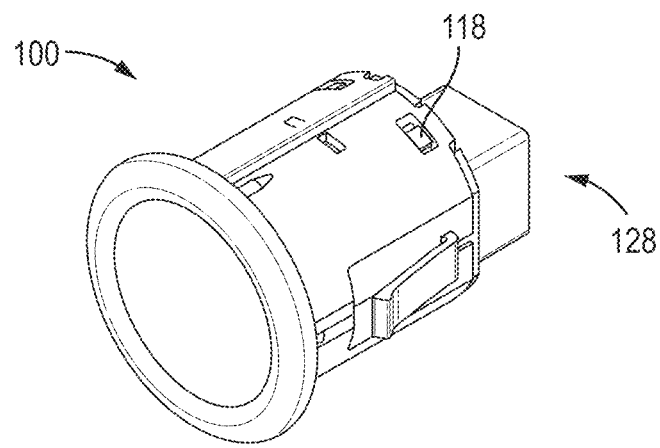
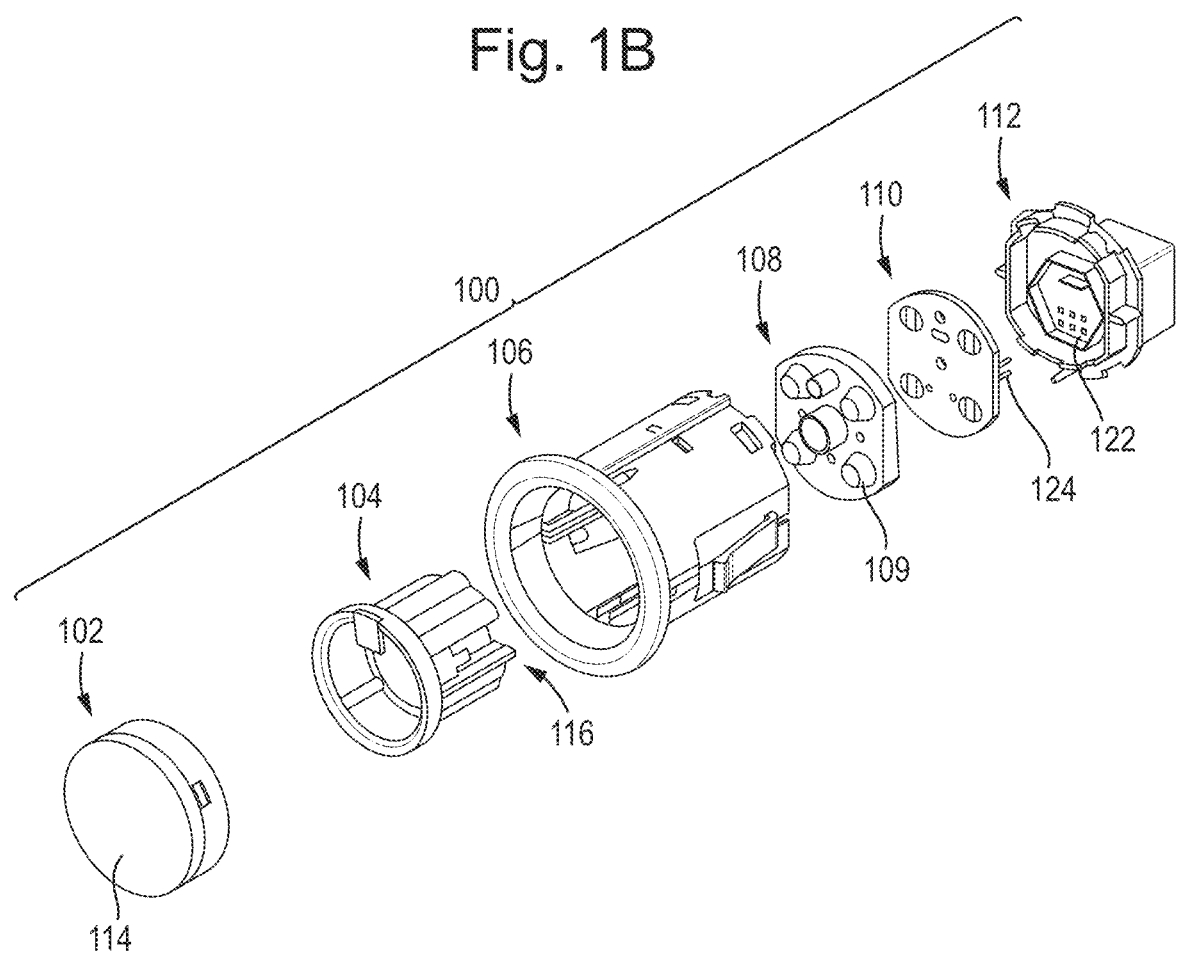

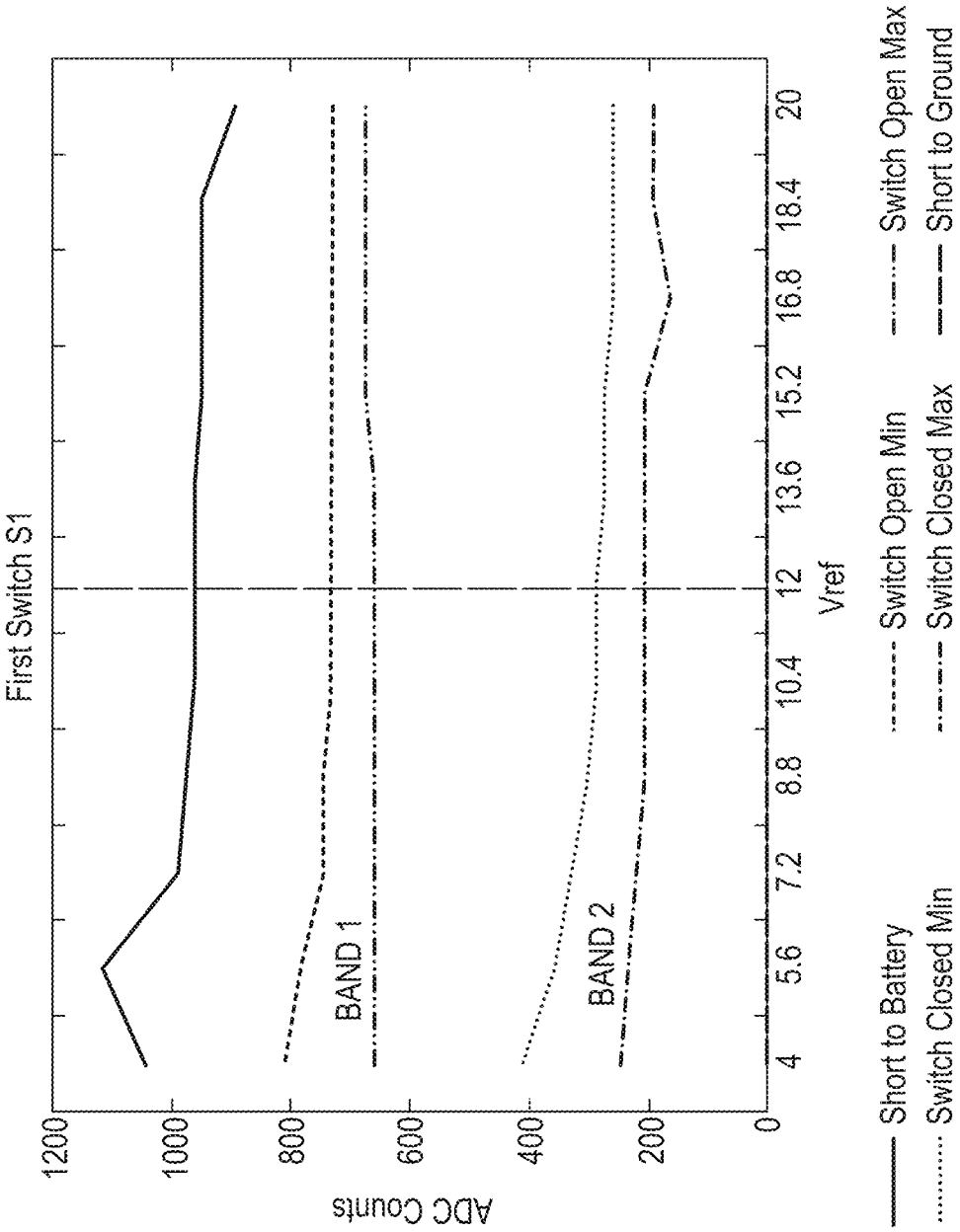

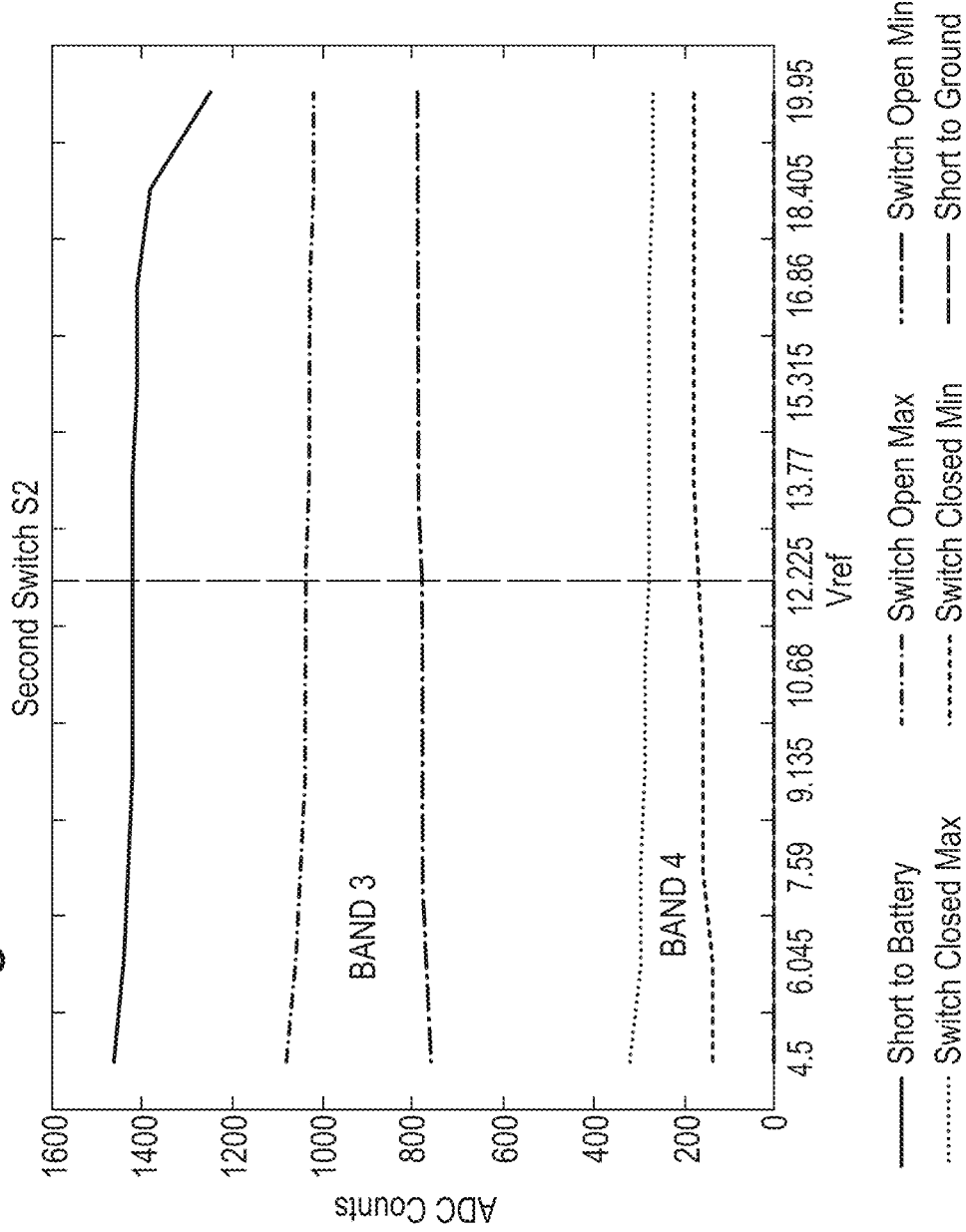

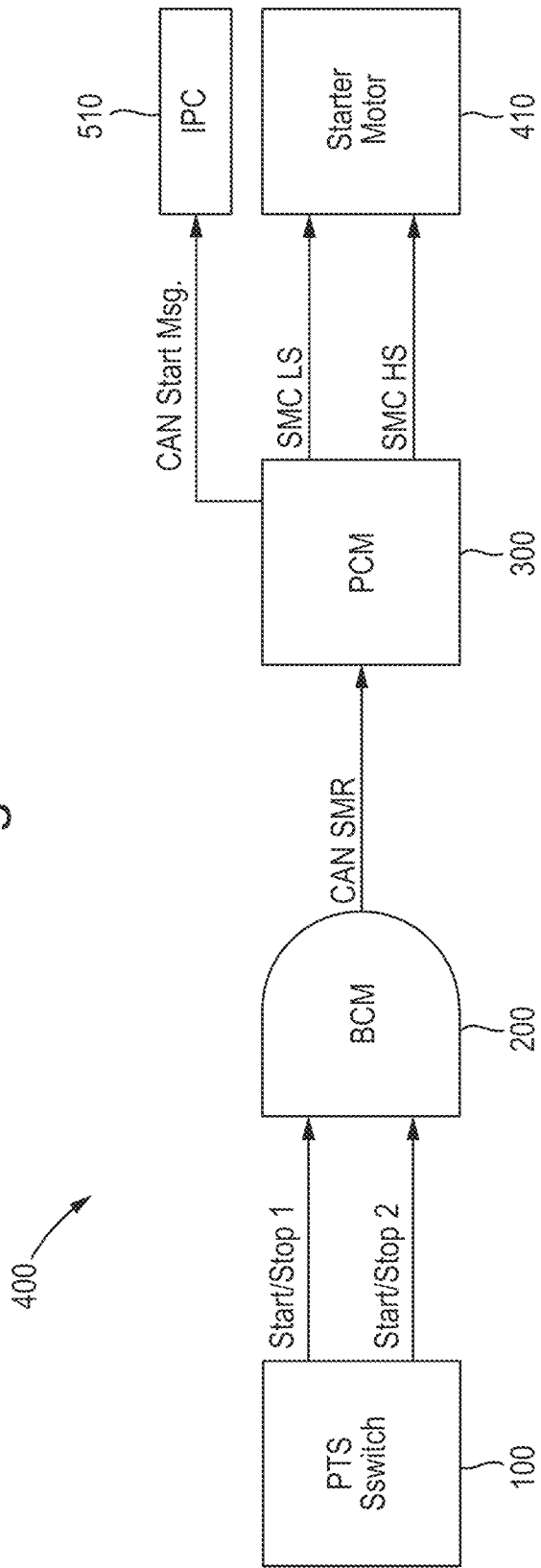

PUSH-BUTTON SWITCH ASSEMBLY AND DIAGNOSIC METHODS THEREOF

BACKGROUND

The present disclosure relates to a push-button switch assembly and method of diagnosing faults with a push-button switch assembly. Particularly, but not exclusively, the present disclosure relates to determining faults in the operation of a push-button start-stop switch of a vehicle.

SUMMARY

It is becoming increasingly common to install a push-button switch in a vehicle to control the operation of a motor of the vehicle. For example, a vehicle may have a push-button stop-start switch assembly located in the cabin of the vehicle so that a driver of the vehicle can start and stop a motor of the vehicle. Such functionality is desirable where a vehicle has a keyless entry system, as it enables a driver to enter and start the vehicle without having to manually operate a conventional ignition switch using a key. Given the increasing prevalence of such systems, it is desirable to be able to determine one or more faults associated with a push-button switch.

This disclosure relates to a low cost and diagnosable push-button interface for use to start and/or stop a motor of a vehicle. Current switches for this purpose may use an interface without the ability to accurately/fully diagnose faults, e.g., as a result of a binary output being measurable from the switch. Being able to diagnose faults with the switch can help prevent an unintentional motor start request and/or an inability for a driver to power down the motor of the vehicle.

Systems and methods are provided herein for determining operational conditions of a push-button switch (e.g., a start-stop push-button switch). Such systems and methods may provide an improved detection of faults of the push-button switch in a vehicle, which in turn prevents the unintended starting or impeded stopping of a motor of the vehicle. In some examples, the motor may be an internal combustion engine, and preventing an unintended start or an impeded stop of a motor can reduce the emissions from the engine due to unintentional engine start requests and/or an inability for a driver to power down the engine when desired.

According to some examples in accordance with an aspect of the disclosure, a push-button switch assembly is provided. The push-button switch assembly comprises a first circuit comprising a first resistor arranged in series with a first switch, and a second resistor arranged in parallel with the first resistor and the first switch. The push-button switch assembly comprises a second circuit comprising a third resistor arranged in series with a second switch, and a fourth resistor arranged in parallel with the third resistor and the second switch. The first switch and the second switch are each closable by displacement of a push-button of the push-button switch assembly.

In some examples, the first resistor of the push-button switch assembly has a lower resistance than the second resistor.

In some examples, the first resistor of the push-button switch assembly has a greater resistance than the third resistor.

In some examples, the first resistor of the push-button switch assembly has a lower resistance than the fourth resistor.

In some examples, the third resistor of the push-button switch assembly has a lower resistance than the second resistor.

In some examples, the third resistor of the push-button switch assembly has a lower resistance than the fourth resistor.

In some examples, the second resistor of the push-button switch assembly has a greater resistance than the fourth resistor.

In some examples, the first circuit of the push-button switch assembly comprises a third switch arranged in parallel with the first switch.

In some examples, the second circuit of the push-button switch assembly comprises a fourth switch arranged in parallel with the second switch.

According to some examples in accordance with another aspect of the disclosure, a vehicle is provided. The vehicle comprises a push-button switch assembly, which comprises a first circuit comprising a first resistor arranged in series with a first switch, and a second resistor arranged in parallel with the first resistor and the first switch. The push-button switch assembly comprises a second circuit comprising a third resistor arranged in series with a second switch, and a fourth resistor arranged in parallel with the third resistor and the second switch. The first switch and the second switch are each closable by displacement of a push-button of the push-button switch assembly.

According to some examples in accordance with another aspect of the disclosure, a controller for a push-button switch assembly is provided. The controller for a push-button switch assembly comprises control circuitry configured to determine a voltage across a first circuit comprising a first resistor arranged in series with a first switch, and a second resistor arranged in parallel with the first resistor and the first switch. The control circuitry is configured to determine a voltage across a second circuit comprising a third resistor arranged in series with a second switch, and a fourth resistor arranged in parallel with the third resistor and the second switch. The first switch and the second switch may be closable by displacement of a push-button of the push-button switch assembly. In some examples, the controller may be configured to determine the state of closure of at least one of the first switch, the second switch, the third switch and/or the fourth switch, e.g., based on the voltage across the first circuit and/or the voltage across the second circuit. In some examples, the controller may be configured to determine an operational condition of the push-button switch assembly, e.g., based on the voltage across the first circuit and/or the voltage across the second circuit. In some examples, operational condition of the push-button switch assembly may be a closure state of at least one of the first switch, the second switch, the third switch and/or the fourth switch of the push-button switch assembly.

In some examples, the control circuitry of the controller for the push-button switch assembly is configured to indicate a fault with the push-button switch assembly based on the operational condition of the push-button switch assembly.

According to some examples in accordance with another aspect of the disclosure, a vehicle is provided. The vehicle comprises a controller for a push-button switch assembly. The controller for the push-button switch assembly comprises control circuitry configured to determine a voltage across a first circuit comprising a first resistor arranged in series with a first switch, and a second resistor arranged in parallel with the first resistor and the first switch. The control circuitry is configured to determine a voltage across a second circuit comprising a third resistor arranged in series with a second switch, and a fourth resistor arranged in parallel with the third resistor and the second switch. The first switch and the second switch may be closable by displacement of a push-button of the push-button switch assembly.

According to some examples in accordance with another aspect of the disclosure, a diagnostic method for a push-button switch assembly is provided. The method comprises determining a voltage across a first circuit comprising a first resistor arranged in series with a first switch, and a second resistor arranged in parallel with the first resistor and the first switch. The method comprises determining a voltage across a second circuit comprising a third resistor arranged in series with a second switch, and a fourth resistor arranged in parallel with the third resistor and the second switch. The first switch and the second switch may be closable by displacement of a push-button of the push-button switch assembly. The method may comprise determining an operational condition of the push-button switch assembly based on a voltage across the first circuit and/or a voltage across the second circuit.

In some examples, determining the operational condition of the push-button switch assembly may comprise determining a reference voltage supplied to the push-button switch assembly, determining that the first switch is closed when the voltage across the first circuit at the reference voltage is within a first predetermined voltage range, determining that the first switch is open when the voltage across the first circuit at the reference voltage is within a second predetermined voltage range, and/or determining that there is a fault with the first switch when the voltage across the first circuit is outside of the first predetermined voltage range and/or the second predetermined voltage range.

In some examples, the step of determining the operational condition of the push-button switch assembly may comprise determining a reference voltage supplied to the push-button switch assembly, determining that the second switch is closed when the voltage across the second circuit at the reference voltage is within a third predetermined voltage range, determining that the second switch is open when the voltage across the second circuit at the reference voltage is within a fourth predetermined voltage range, and/or determining that there is a fault with the second switch when the voltage across the first circuit is outside of the first predetermined voltage range and/or the second predetermined voltage range.

In the context of the present disclosure, a vehicle may be any appropriate type of vehicle, such as an automobile, a motorbike, a marine vessel, or an aircraft. In some examples, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV), or any other vehicle having an engine and an electrified powertrain. In some examples, the systems and methods described herein may be used on or with any machinery or equipment, e.g., a generator, requiring operational control by a user/operator.

Moreover, in the context of the present disclosure, the term "driver" or "user" may mean any person who operates a vehicle or any machinery or equipment.

These examples and other aspects of the disclosure will be apparent and elucidated with reference to one or more of the examples described hereinafter. It should also be appreciated that particular combinations of the various examples and features described above and below are often illustrative and any other possible combination of such examples and features are also intended, notwithstanding those combinations that are intended as mutually exclusive.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1A illustrates a push-button switch assembly, in accordance with some examples of the disclosure;

FIG. 1B illustrates an exploded view of the push-button switch assembly, in accordance with some examples of the disclosure;

FIG. 3A is a graphical representation of analogue to digital conversion count measurements from the push-button switch assembly, in accordance with some examples of the disclosure;

FIG. 3B is a graphical representation of analogue to digital conversion count measurements from the push-button switch assembly, in accordance with some examples of the disclosure;

FIG. 4 illustrates a block diagram of a system for starting a motor of a vehicle, in accordance with some examples of the disclosure;

DETAILED DESCRIPTION

Figure 1C:
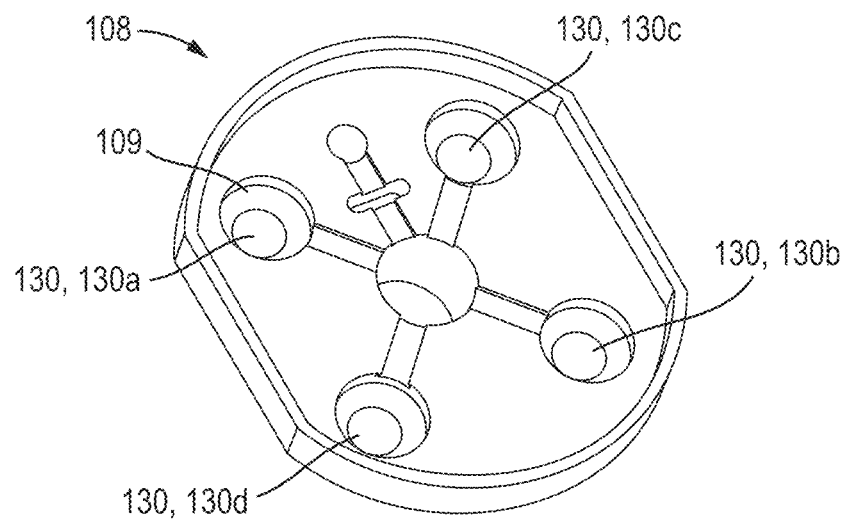
FIG. 1C illustrates detailed view of a keypad of the push-button switch assembly, in accordance with some examples of the disclosure.
Figure 1D:
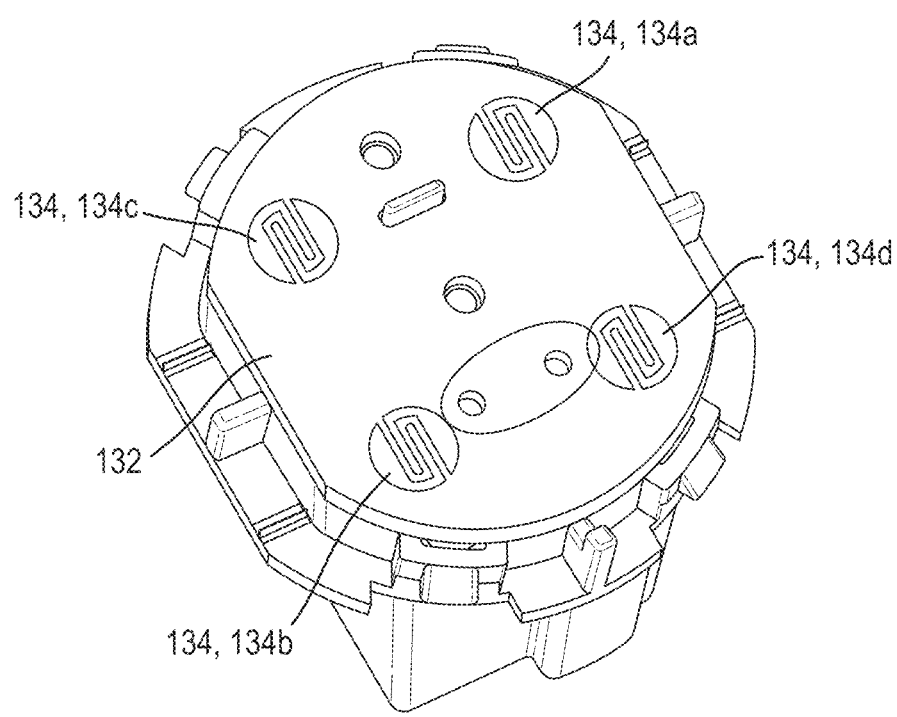
FIG. 1D illustrates a detailed view of a back cover and a circuit board of the push-button switch assembly, in accordance with some examples of the disclosure.

FIG. 1A illustrates a push-button switch assembly 100, e.g., for use in a stop-start system of a vehicle. For example, the push-button switch assembly 100 may be operationally coupled to a controller of the vehicle to cause a motor of the vehicle to be started or stopped upon operation, e.g., depression and release, of the push-button switch assembly 100 by a user. FIG. 1B shows an exploded view of the push-button switch assembly 100, and FIGS. 1C and 1D show detailed views of some of the components of the push-button switch assembly 100. As shown in FIG. 1B, the push-button switch assembly 100 comprises a push-button 102, a slider 104, a housing 106, a keypad 108, a circuit board 110 and an end cover 112. In an assembled configuration, the push-button 102 and the slider 104 sit in the housing 106 and are slidable with respect to a longitudinal axis of the housing 106. In some examples, the push-button 102 and the slider 104 may be formed as a single piece. However, it is understood that, irrespective of the exact configuration of the push-button 102 and the slider 104, the push-button 102 and the slider 104 are moveable within the housing 106, e.g., upon application of a push force on an operational surface 114 of the push-button 102, to cause an end 116 of the slider 104 to deform keypad 108. In some examples, the push-button switch assembly 100 comprises a biasing means configured to act against a push force of a user and return the push-button 102 and the slider 104 back to its initial position prior to user operation. Additionally or alternatively, keypad 108 comprises one or more resilient portions 109 configured to deform upon engagement by an axial displacement of the end 116 of the slider 104, and provide a biasing force acting to return the push-button 102 and the slider 104 back to its initial position, e.g., following release of the push-button 102 by a user. Keypad 108 is mounted against (or near to) circuit board 110, the detail of which is discussed below. Circuit board 110 sits in end cover 112, which is retained in housing 106 by one or more fasteners 118, e.g., clips, as shown in FIG. 1A. The end cover 112 comprises one or more openings 122 through which respective electrical contacts, e.g., pins 124, of the circuit board 110 extend in an assembled configuration. The end cover 112 comprises a connector port 126, configured to receive and secure an electrical connector (not shown) to a rear end 128 of the push-button switch assembly 100, the electrical connector being configured to connect to the pins 124 of the circuit board 110, e.g., so that electrical power may be supplied to the push-button switch assembly 100 and/or one or more operational parameters of the push-button switch assembly 100 may be measured.

FIG. 1C shows the keypad 108 in an inverted position. The keypad 108 comprises one or more electrical contacts 130, each of which are provided on an underside of respective deformable portions 109. When the keypad 108 is in a relaxed state, e.g., when the push-button switch assembly 100 is in its initial position, each electrical contact 130 is separated from face 132 of circuit board 110. When the keypad 108 is in a deformed state, e.g., upon displacement of push-button 102 and slider 104 in housing 106, each electrical contact 130 is urged towards face 132 of circuit board 110 to cause contact between each electrical contact 130 and respective switch contacts 134 of circuit board 110. In this manner, displacement of the push-button 102 and and slider 104 in housing 106 causes at least one electrical circuit of circuit board 110 to be closed by virtue of engagement of electrical contact 130 with switch contact 134. In the example shown in FIG. 1D, the circuit board 110 comprises four switch contacts 134 that are each closable by respective electrical contacts 130 of the keypad 108. In the context of the present disclosure, it is understood that each electrical contact-switch contact pair make up a switch of the push-button switch assembly 100. Details of the electrical circuits of circuit board 110 are discussed below in relation to FIG. 2.

Figure 2:
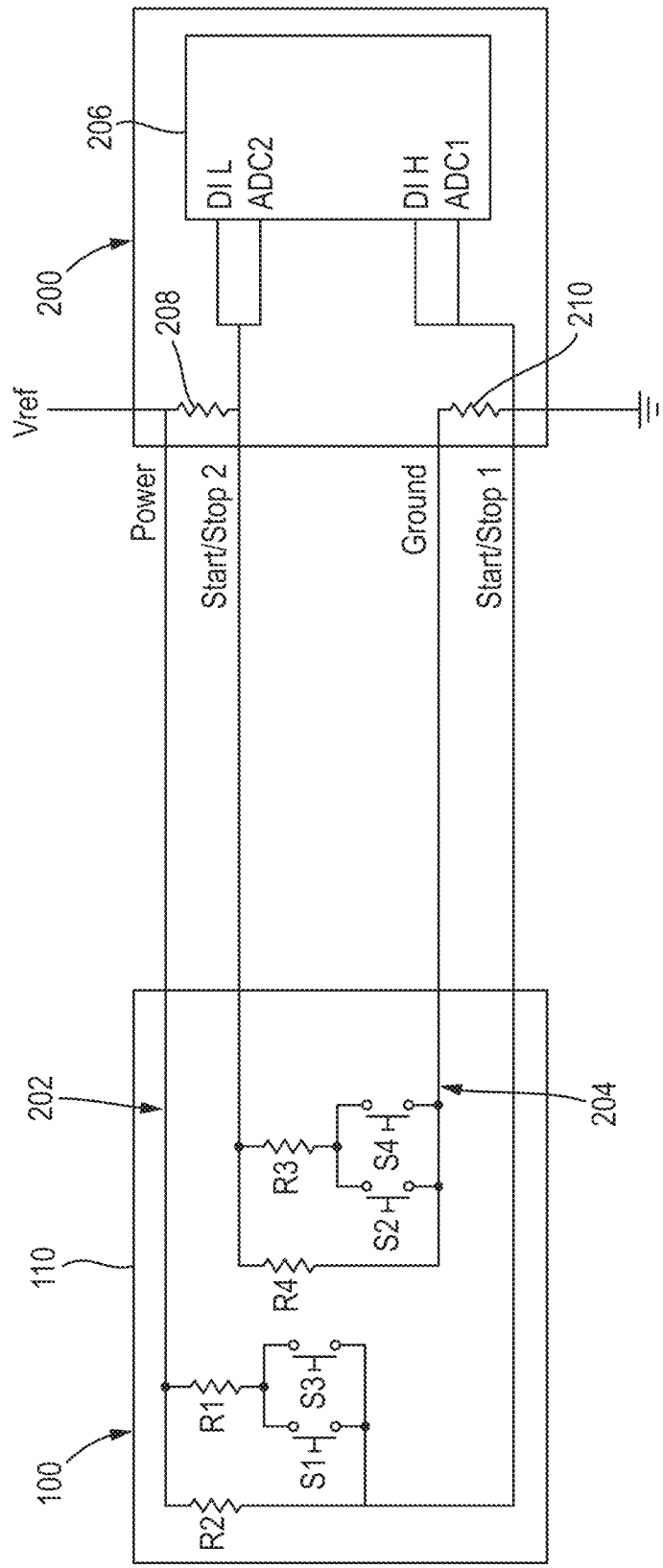
FIG. 2 illustrates a circuit diagram of the circuit board of the push-button switch assembly, in accordance with some examples of the disclosure.

FIG. 2 shows a circuit diagram of the circuit board 110 of the push-button switch assembly 100. Circuit board 110 comprises a first circuit 202, configured to connect a reference voltage Vref (e.g., a 12 V vehicle battery) to a controller 200, and a second circuit 204, configured to connect the controller 200 to ground. The first circuit 202 comprises a first switch Si and a third switch S3 arranged in parallel with each other. As such, closure of S1 and/or S3 acts to complete the first circuit 202. In the example shown in FIGS. 1C and 1D, S1 comprises electrical contact 130a and switch contact 134a, and S3 comprises electrical contact 130b and switch contact 134b. Circuit board 110 comprises a first resistor R1 arranged in series with S1 and S3, and a second resistor R2 arranged in parallel with R1 and S1/S3. In the example shown in FIG. 2, R1 has a resistance of 470Ω and a tolerance of 1%, and R2 has a resistance of 4.7 kΩ and a tolerance of 1%. The second circuit 204 comprises a second switch S2 and a fourth switch S4 arranged in parallel with each other. As such, closure of S2 and/or S4 acts to complete the second circuit 204. In the example shown in FIGS. 1C and 1D, S2 comprises electrical contact 130c and switch contact 134c, and S4 comprises electrical contact 130d and switch contact 134d. Circuit board 110 comprises a third resistor R3 arranged in series with S2 and S4, and a fourth resistor R4 arranged in parallel with R3 and S2/S4. In the example shown in FIG. 2, R3 has a resistance of 300Ω and a tolerance of 1%, and R4 has a resistance of 3 kΩ and a tolerance of 1%. It is understood that the resistance and tolerance values stated herein are used by way of example, and are not intended to limit the scope of the disclosure.

In the example shown in FIG. 2, controller 200 comprises control circuitry 206 configured to measure a voltage V1 across the first circuit 202 and a voltage V2 across the second circuit 204. Additionally, control circuitry 206 comprises at least one analogue to digital convertor (ADC) module configured to perform an ADC count on each of the measured voltages V1 and V2. For example, ADC module ADC1 performs an ADC count for the first circuit 202 and ADC module ADC2 performs an ADC count for the second circuit 204. Control circuitry 206 may comprise one or more digital modules, e.g., digital input low (DI L) and/or digital input high (DI H) configured to control the input to respective ADC modules ADC1 and ADC2.

In use, circuit 202 is supplied from the controller 200 with a reference voltage Vref as described above. Vref is coupled to the control circuitry 206 with an associated pull-down resistor 208, for pulling the Vref input down to the ground in the absence of a signal from the push-button switch assembly 100. Similarly, the control circuitry 206 is coupled to the ground with a pull-up resistor 210 for pulling the input of the second circuit 204 up to the reference voltage Vref in the absence of a signal from the push-button switch assembly 100. When the switch S1 and/or the switch S3 closes it feeds Vref from controller 200 to the first circuit 202 which overcomes the pull-down resistor 208 to provide a positive-going input pulse edge. When switch S2 and/or switch S4 closes it feeds 0 Volts from controller 200 to the second circuit 204 which overcomes the pull-up resistor 210 to provide a negative-going input pulse edge.

FIG. 3 is graphical representation of ADC count measurements from the push-button switch assembly 100 versus the reference voltage Vref supplied to the push-button switch assembly 100. The ADC count can be used as an estimation of the voltages V1 and V2 being read by the ADC compared to the reference voltage Vref. From that, voltages V1 and V2 can be determined from the ADC count, by multiplying the ADC count(s) and the Least Significant Bit (LSB) of the ADC. The LSB corresponds to the smallest level that an ADC can convert which is determined by the following known formula:

$$LSB = Vref/2^N$$

Wherein Vref is Vbat, N is the number of bits the ADC comprises and $2^N$ is the maximum number of counts the ADC can separate an analog voltage into.

Accordingly, a count range of the ADC count is proportional to the reference voltage range (e.g., 0 to 2047 counts corresponds to 0 to Vref in an 11-bit ADC, and 0 to 1023 counts corresponds to 0 to Vref in a 10-bit ADC). In particular, the graph of FIG. 3A shows ADC counts corresponding to various operational conditions of S1 (or S3) of the first circuit 202 as the reference voltage changes, and the graph of FIG. 3B shows ADC counts corresponding to various operational conditions of S2 (or S4) of the second circuit 204 as the reference voltage changes. For the avoidance of doubt, closure of either or both of S1 and S3 completes the first circuit 202 and enables the ADC count to be determined for the first circuit 202, and closure of either or both of S2 and S4 completes the second circuit 204 and enables the ADC count to be determined for the second circuit 204.

The various lines in the graphs of FIGS. 3A and 3B indicate the minimum and maximum expected ADC counts (which are equivalent to expected voltages) that will be read due to the resistive ladder design for the corresponding condition shown in the legend. For example, the graph of FIG. 3A shows minimum and maximum expected ADC counts of approximately 670 and 740 (Band 1), respectively, at Vref=12 Volt, for the first circuit 202 when the switch S1 and/or the switch S3 are open, and minimum and maximum expected ADC counts of approximately 300 and 200 (Band 2), respectively, at Vref=12 Volt, for the first circuit 202 when the switch S1 and/or the switch S3 are closed. The ADC of the first circuit 202 may be a 10-bit circuit which, using the LSB formula above, which would equate to that ADC having a maximum of 1024 counts and the LSB being 0.012 Volt. Multiplying the ADC counts (e.g., minimum of 670 and maximum of 740) with the LSB of 0.012 Volt gives an expected voltage range of 8.04V to 8.88V when the switch S1/S3 is open. In a similar manner, the minimum and maximum expected voltages for the switch S1/S3 being closed can be calculated with the ADC count values associated with the "switch closed min" and "switch closed max" from the graph of FIG. 3A. This equates to a voltage range of roughly 2.40V to 3.36V at Vref=12V. As indicated in the graph of FIG. 3A, Vref can be any appropriate range, e.g., between 4V to 20V. Corresponding ADC counts for the expected minimum and maximum voltages for switch S1/S3 being shorted to battery (e.g., Vref) and shorted to ground (e.g., V=0V) are also indicated on the graph of FIG. 3A.

Whereas the first circuit 202 may comprise a 10-bit ADC, the second circuit 204 may comprise an 11-bit ADC. Accordingly, the maximum number of counts for the ADC in the second circuit 204 would be 2048 (ranging from 0 to 2047) with an LSB of 0.0059V. At Vref=12V, the minimum and maximum ranges for the switch S2/S4 being open are roughly 790 and 1040 (Band 3), respectively, leading to an expected voltage range of 4.66V to 6.14V when the switch S2/S4 is open, and the minimum and maximum expected ADC counts of approximately 190 and 300 (Band 4), respectively, at Vref=12 Volt, for the first circuit 202 when the switch S2 and/or the switch S4 are closed. The minimum and maximum expected voltage for the switch S2/S4 being closed can be calculated in a similar manner by using the ADC counts associated with the "switch closed min" and "switch closed max" ADC counts from the graph of FIG. 3B (roughly 190 and 300, respectively). This equates to a voltage range of roughly 1.12V to 1.77V at Vref=12V. As indicated in the graph of FIG. 3B, Vref can range anywhere between 4.5V to 20V. Corresponding ADC counts for the expected minimum and maximum voltages for switch S1/S3 being shorted to battery (e.g., Vref) and shorted to ground (e.g., V=0V) are also indicated on the graph of FIG. 3B.

If ADC counts are measured outside of the expected minimum and/or maximum range (e.g., band) at a certain Vref (e.g., 500 ADC counts are measured at the first circuit 202), a fault code is triggered which can be used to prevent unintended start or impeded stop of the engine. Depending on whether the ADC counts fall outside of the ranges when the switch is open or closed, a different error message may be displayed to the user of the vehicle (e.g., to indicate which circuit the fault has to do with and whether the fault occurred while the switch was open or closed). It is understood that the ADC count and voltage values stated herein are used by way of example, and are not intended to limit the scope of the disclosure. Additionally or alternatively, changing the resistance of one or more of R1 to R4 will lead to different ADC count measurements indicating the operational condition of the switch assembly. For example, the position and/or size of the predetermined ranges (e.g., bands) as illustrated on FIGS. 3A and 3B.

FIG. 4 shows a block diagram of a system 400 for starting a motor of a vehicle. System 400 comprises push-button switch assembly 100 operationally coupled to a first controller 200, e.g., a body control module (BCM) of the vehicle as described above with reference to FIGS. 1 to 3. System 400 further comprises a second controller 300 (e.g., a powertrain control module (PCM)), an instrument panel cluster (IPC), and a Starter Motor.

Faults with the push-button switch assembly 100 are determined at the BCM 200 as described above with reference to FIGS. 1 to 3. In particular, the BCM comprises control circuitry configured to determine a voltage V1 across a first circuit 202 comprising a first resistor R1 arranged in series with a switch S1 (and/or S3), and a second resistor R2 arranged in parallel with the first resistor R1 and the switch S1 (and/or S3), and determine a voltage across a second circuit 204 comprising a third resistor R3 arranged in series with a switch S2 (and/or S4), and a fourth resistor R4 arranged in parallel with the third resistor R3 and the switch S2 (and/or S4), wherein switch S1/S3 and switch S2/S4 being closable by displacement of a push-button of the push-button switch assembly 100.

In some arrangements, the BCM may be configured to determine an operational condition of the push-button switch assembly 100 based on the voltage across the first circuit 202 and/or the voltage across the second circuit 204. This may include indicating a fault with the push-button switch assembly based on the operational condition of the push-button switch assembly. The operational condition corresponds to the range between the minimum and maximum expected ADC counts (or voltage) as discussed above with reference to FIGS. 3A and 3B.

That fault can then be sent to the PCM which is operationally coupled to the BCM. The PCM is operationally coupled to the IPC and starter motor and can prevent the starter motor from unintended start in the event of a fault. Simultaneously, the PCM forwards fault codes relating to the fault to the IPC to display them to the user of the vehicle, thereby making the user aware of the fault.

Figure 5:
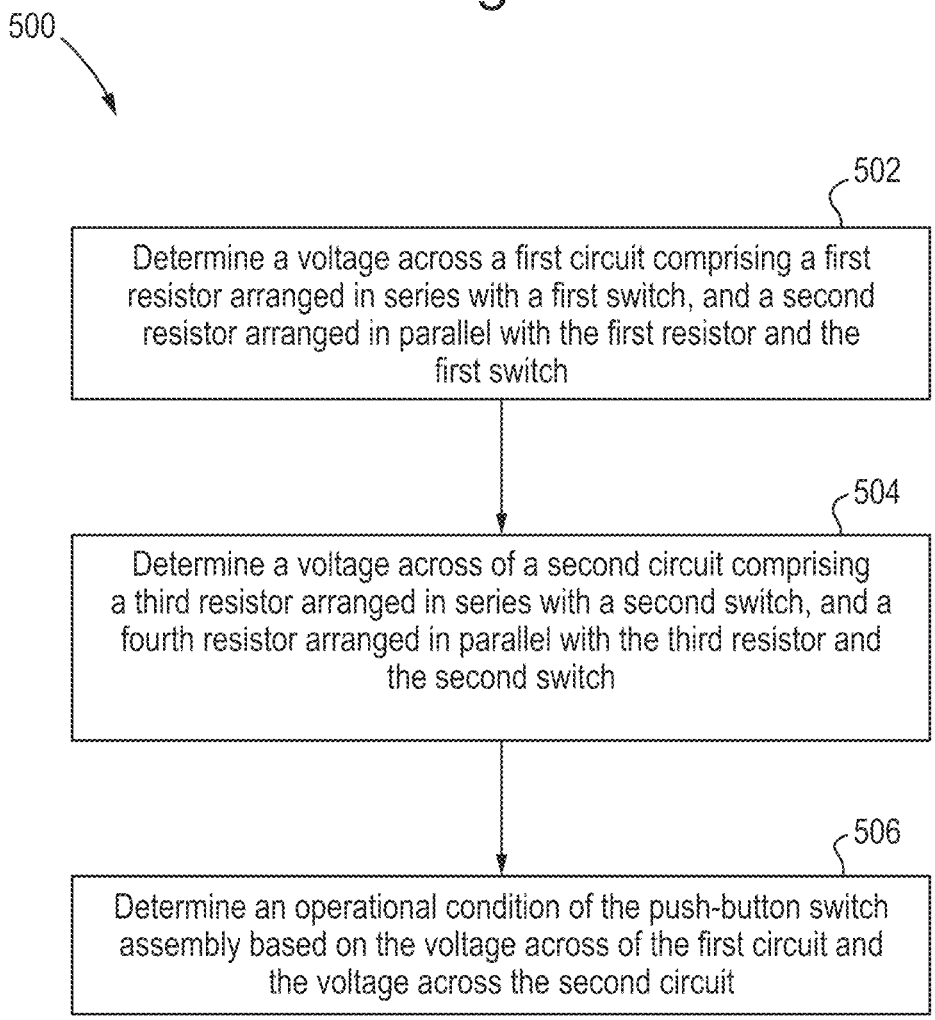
FIG. 5 is a flow chart illustrating a diagnostic method for a push-button switch assembly, in accordance with some examples of the disclosure.

FIG. 5 is a flowchart representing an illustrative process 500 for determining an operational condition of a push-button switch assembly, in accordance with some examples of the disclosure. While the example shown in FIG. 5 refers to the use of systems 100 and 200, as shown in FIGS. 1 and 2, it will be appreciated that the illustrative process shown in FIG. 5, and any of the other following illustrative processes, may be implemented on systems 100 and 200, either alone or in combination with any other appropriately configured system architecture.

At step 502, a voltage across a first circuit (e.g., circuit 202 as described in FIG. 2) is determined, wherein the first circuit may comprise a first resistor (e.g., resistor R1 as described in FIG. 2) arranged in series with switch S1 and switch S3 as described in FIG. 2, and a second resistor (e.g., resistor R2 as described in FIG. 2) arranged in parallel with the first resistor and switches S1 and S3.

At step 504, a voltage across a second circuit (e.g., circuit 204 as described in FIG. 2) is determined, wherein the second circuit may comprise a third resistor (e.g., resistor R3 as described in FIG. 2) arranged in series with switch S2 and switch S4 as described in FIG. 2, and a fourth resistor (e.g., resistor R4 as described in FIG. 2) arranged in parallel with the third resistor and switches S2 and S4.

Switches S1/S3 and switches S2/S4 are closable by displacement of a push-button switch assembly, such as the push-button switch assembly 100 as described above with reference to FIG. 1 and FIG. 2.

In some examples, S1 and S3 are arranged in parallel with each other. As such, closure of at least one of S1 and/or S3 acts to complete the first circuit 202 as described above. To achieve a more efficient effect of completing the circuit additional switches can be arranged in parallel to S1 and/or S3 to complete the first circuit. Similarly, switches, S2 and S4 are arranged in parallel with each other. As such, closure of at least one of S2 and/or S4 acts to complete the second circuit 204 as described above. To achieve a more efficient effect of completing the circuit additional switches can be arranged in parallel to S2 and/or S4 to complete the second circuit.

At step 506, an operational condition of the push-button switch assembly is determined based on the voltage across the first circuit and/or the voltage across the second circuit, which is determined based on respective ADC counts (e.g., as described above with reference to FIGS. 3A and 3B).

The actions or descriptions of FIG. 5 may be used with any other example of this disclosure such as, but not limited to, the example described below in relation to FIGS. 6 and 7. In addition, the actions and descriptions described in relation to FIG. 5 may be done in any suitable alternative orders or in parallel to further the purposes of this disclosure.

Figure 6:
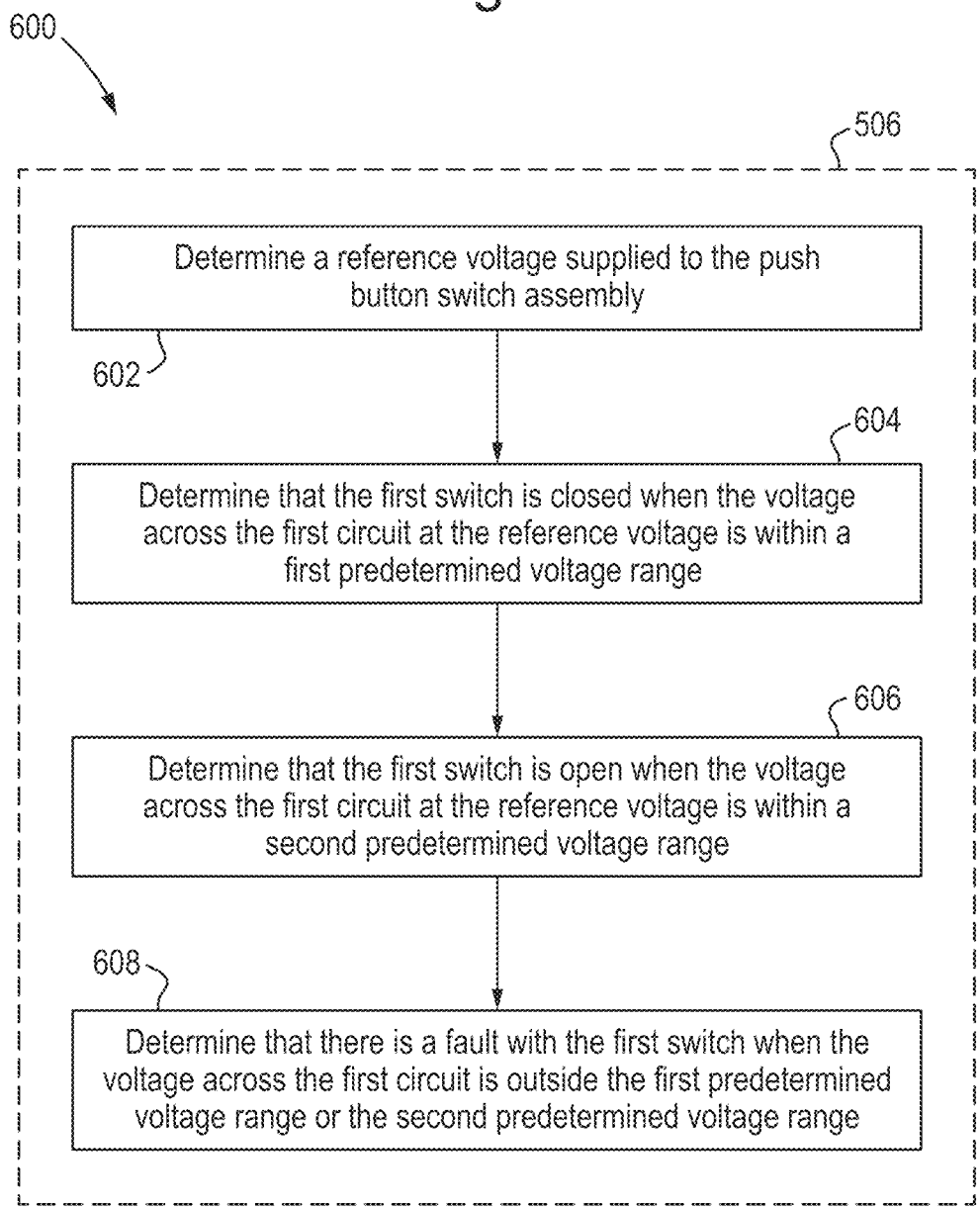
FIG. 6 is a flow chart illustrating optional steps of the flow chart shown in FIG. 5, in accordance with some examples of the disclosure.

FIG. 6 is a flowchart showing optional steps of step 506 from FIG. 5 representing an illustrative process 600 for determining a fault with the first switch S1/S2 of the push-button assembly 100, in accordance with some examples of the disclosure. While the example shown in FIG. 6 refers to the use of systems 100 and 200, as shown in FIGS. 1 and 2, it will be appreciated that the illustrative process shown in FIG. 6, and any of the other following illustrative processes, may be implemented on systems 100 and 200, either alone or in combination with any other appropriately configured system architecture.

Step 602 carries over from step 506 of FIG. 5. At step 602, a reference voltage Vref (e.g., a 12 V vehicle battery) supplied to the push-button switch assembly 100 is determined (e.g., by a meter reading).

At step 604 switch S1/S3 is determined to be closed when the voltage across the first circuit 202 at the reference voltage Vref is within a first predetermined voltage range (Band 1). The first predetermined voltage range may correspond to the voltage range calculated from the expected minimum and maximum ADC counts when switch S1/S3 is closed as discussed above with reference to FIGS. 3A and 3B.

At step 606 the switch S1/S3 is determined to be open when the voltage across the first circuit 202 at the reference voltage Vref is within a second predetermined voltage range (Band 2). The second predetermined voltage range may correspond to the voltage range calculated from the expected minimum and maximum ADC counts when switch S1/S3 is open as discussed above with reference to FIGS. 3A and 3B. In some examples, the second predetermined voltage range is lower than the first predetermined voltage range. For example, the ADC count is high when the switches are open and the ADC count is low when the switches are closed—in other words voltage measurements are high when the switches are open and low when switches are closed.

At step 608 a fault is determined with switch S1/S3 when the voltage across the first circuit 202 is outside of the first predetermined voltage range or the second predetermined voltage range.

Figure 7:
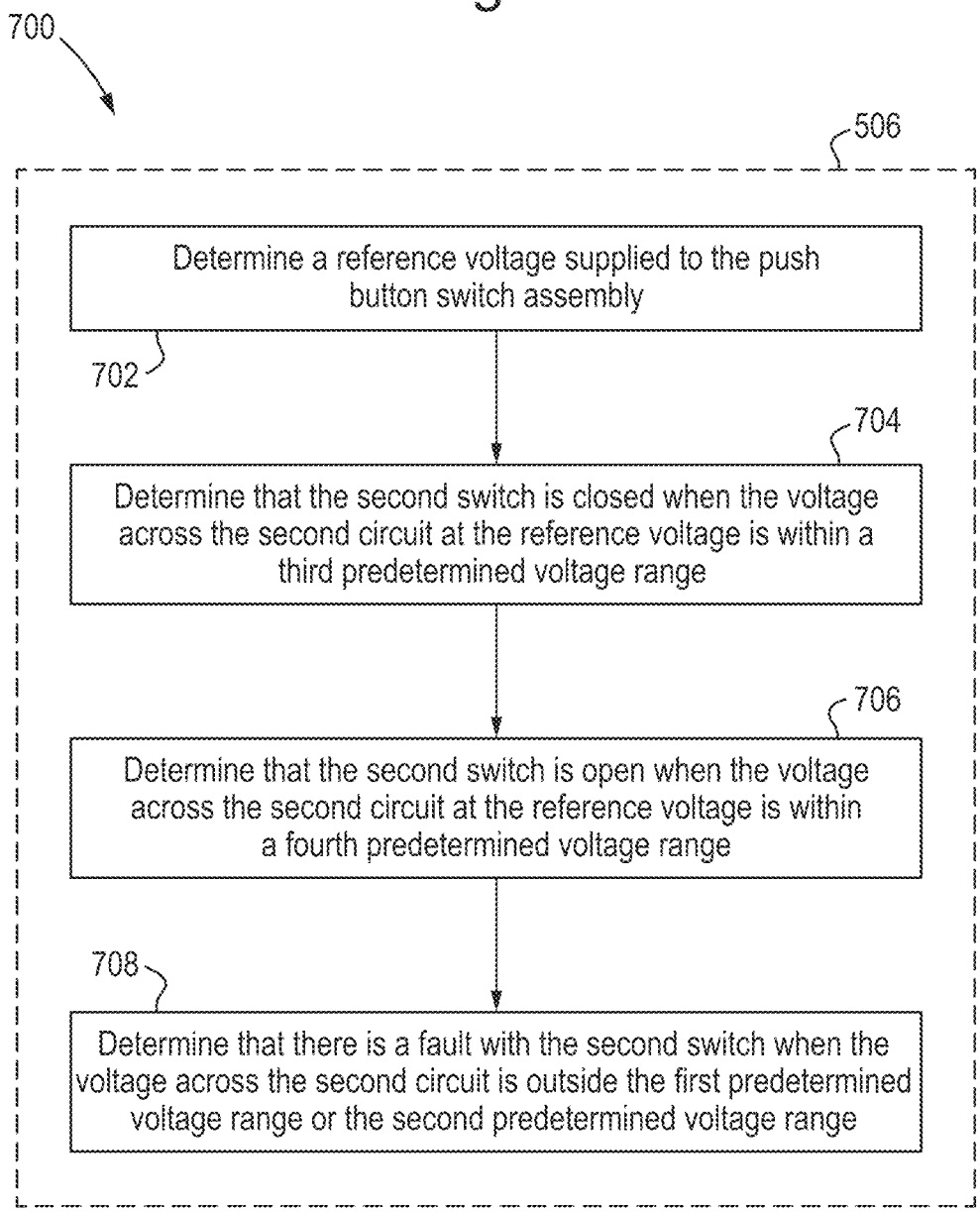
FIG. 7 is a flow chart illustrating optional steps of the flow chart shown in FIG. 5, in accordance with some examples of the disclosure.

FIG. 7 is a flowchart showing optional steps of step 506 from FIG. 5 representing an illustrative process 700 for determining a fault with switch S2/S4 of the push-button assembly 100, in accordance with some examples of the disclosure. While the example shown in FIG. 7 refers to the use of systems 100 and 200, as shown in FIGS. 1 and 2, it will be appreciated that the illustrative process shown in FIG. 7, and any of the other following illustrative processes, may be implemented on systems 100 and 200 as well as in combination with illustrative processes 500 and/or 600, either alone or in combination with any other appropriately configured system architecture.

At step 702, a reference voltage Vref (e.g., a 12 V vehicle battery) supplied to the push-button switch assembly 100 is determined (e.g., by a meter reading).

At step 704 switch S2/S4 is determined to be closed when the voltage across the second circuit 204 at the reference voltage Vref is within a third predetermined voltage range (Band 3). The third predetermined voltage range may correspond to the voltage range calculated from the expected minimum and maximum ADC counts when switch S2/S4 is closed as discussed above with reference to FIGS. 3A and 3B.

At step 706 switch S2/S4 is determined to be open when the voltage across the second circuit 204 at the reference voltage Vref is within a fourth predetermined voltage range (Band 4) from the expected minimum and maximum ADC counts when switch S2/S4 is open as discussed above with reference to FIGS. 3A and 3B.

In some examples, the fourth predetermined voltage range is lower than the third predetermined voltage range. For example, the ADC count is high when the switches are open and the ADC count is low when the switches are closed—in other words voltage measurements are high when the switches are open and low when switches are closed. The third predetermined voltage range and fourth predetermined voltage range may be measured in ADC counts as described above with reference to FIG. 2 and FIGS. 3A and 3B.

At step 708 a fault is determined with switch S2/S4 when the voltage across the second circuit 204 is outside of the third predetermined voltage range or the fourth predetermined voltage range.

Figure 8:
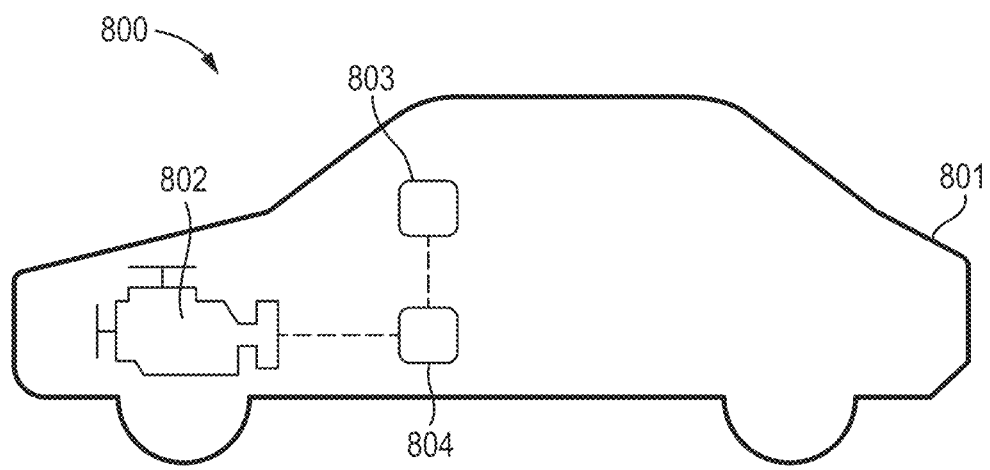
FIG. 8 is a vehicle having a push-button switch assembly, in accordance with some examples of the disclosure.

FIG. 8 is a vehicle 800 having a push-button switch assembly 803, in accordance with some examples of the disclosure. The vehicle 800 has a body 801 housing a motor 802, shown at the front of the vehicle 800. Within the body of the vehicle 800 there is a push-button switch assembly 803 and a controller 804 (e.g., the controller 200 as described in FIGS. 2 and 4). The push-button switch assembly 803 is connected via a wiring loom (not shown) to the controller 804. The controller 804 is connected to the motor 802 also via the wiring loom. The controller 804 may be operationally coupled to a push-button switch assembly 803 (e.g., the push-button switch assembly 100 as described in FIGS. 1, 2 and 4) to cause the motor 802 of the vehicle 800 to be started or stopped upon operation of the push-button switch assembly 803 by a user. In some examples causing the motor 802 of the vehicle 800 to be started or stopped upon operation of the push-button switch assembly 100 by a user may include carrying out, by the controller 200, 804, any one of the illustrative processes described above in reference to FIGS. 5 to 7.

Figure 9:
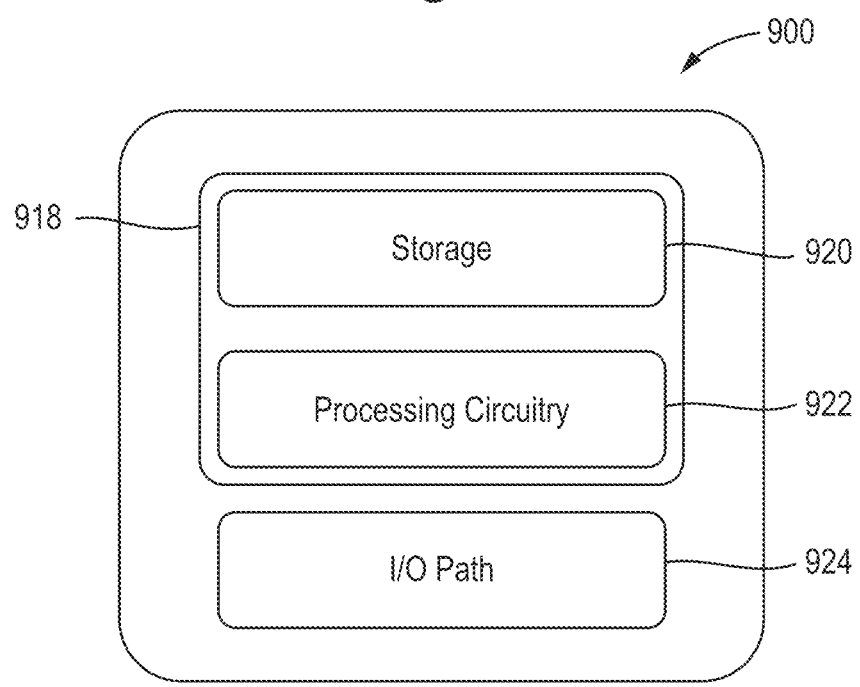
FIG. 9 is a controller for a push-button switch assembly, in accordance with some examples of the disclosure.

FIG. 9 is a controller 900 for a push-button switch assembly (100, 803), in accordance with some examples of the disclosure. In some examples controller 900 is similar to that described in FIGS. 1, 2, 4 and 8 above (i.e., controller 200, 804). The controller 900 has a control circuitry 918 and an input/output (I/O) path 924. The control circuitry 918 carries storage circuitry 920 and processing circuitry 922. The storage circuitry 920 may be at least partly non-volatile. The storage circuitry 920 contains program data for instructing the processing circuitry 922 to run one or more programs that process incoming signals from the I/O path 924 and provide output signals via the I/O path 924. The output signals are mainly interpreted by the circuitry that receives them as commands. In the present context, incoming signals include those from the starter switch and output commands include those destined for starter motor operating circuitry.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A push-button switch assembly comprising:
a first circuit comprising a first resistor arranged in series with a first switch, and a second resistor arranged in parallel with the first resistor and the first switch; and
a second circuit comprising a third resistor arranged in series with a second switch, and a fourth resistor arranged in parallel with the third resistor and the second switch, wherein the first switch and the second switch are each closable by displacement of a push-button of the push-button switch assembly.

2. The push-button switch assembly of claim 1, wherein the first resistor has a lower resistance than the second resistor.

3. The push-button switch assembly of claim 1, wherein the first resistor has a greater resistance than the third resistor.

4. The push-button switch assembly of claim 1, wherein the first resistor has a lower resistance than the fourth resistor.

5. The push-button switch assembly of claim 1, wherein the third resistor has a lower resistance than the second resistor.

6. The push-button switch assembly of claim 1, wherein the third resistor has a lower resistance than the fourth resistor.

7. The push-button switch assembly of claim 1, wherein the second resistor has a greater resistance than the fourth resistor.

8. The push-button switch assembly of claim 1, wherein first circuit comprises a third switch arranged in parallel with the first switch.

9. The push-button switch assembly of claim 1, wherein second circuit comprises a fourth switch arranged in parallel with the second switch.

10. A vehicle comprising the push-button switch assembly of claim 1.

11. A controller for a push-button switch assembly, the controller comprising control circuitry configured to:
determine a voltage across a first circuit comprising a first resistor arranged in series with a first switch, and a second resistor arranged in parallel with the first resistor and the first switch; and
determine a voltage across a second circuit comprising a third resistor arranged in series with a second switch, and a fourth resistor arranged in parallel with the third resistor and the second switch.

12. The controller according to claim 11, the control circuitry being configured to:
determine an operational condition of the push-button switch assembly based on the voltage across the first circuit and/or the voltage across the second circuit.

13. The controller according to claim 12, the control circuitry being configured to:
indicate a fault with the push-button switch assembly based on the operational condition of the push-button switch assembly.

14. A vehicle comprising the controller of claim 12.

15. A diagnostic method for a push-button switch assembly, the method comprising:
determining a voltage across a first circuit comprising a first resistor arranged in series with a first switch, and a second resistor arranged in parallel with the first resistor and the first switch;
determining a voltage across a second circuit comprising a third resistor arranged in series with a second switch, and a fourth resistor arranged in parallel with the third resistor and the second switch; and
determining an operational condition of the push-button switch assembly based on the voltage across the first circuit and/or the voltage across the second circuit.

16. The diagnostic method of claim 15, wherein determining the operational condition of the push-button switch assembly comprises:
determining a reference voltage supplied to the push-button switch assembly;
determining that the first switch is closed when the voltage across the first circuit at the reference voltage is within a first predetermined voltage range;
determining that the first switch is open when the voltage across the first circuit at the reference voltage is within a second predetermined voltage range; and
determining that there is a fault with the first switch when the voltage across the first circuit is outside of the first predetermined voltage range or the second predetermined voltage range.

17. The diagnostic method of claim 15, wherein determining the operational condition of the push-button switch assembly comprises:
determining a reference voltage supplied to the push-button switch assembly;

determining that the second switch is closed when the voltage across the second circuit at the reference voltage is within a third predetermined voltage range;

determining that the second switch is open when the voltage across the second circuit at the reference voltage is within a fourth predetermined voltage range; and determining that there is a fault with the second switch when the voltage across the first circuit is outside of the first predetermined voltage range or the second predetermined voltage range.

\* \* \* \* \*